USOO6211898B1

United States Patent
Tabuchi

(10) Patent No.: US 6,211,898 B1
(45) Date of Patent: Apr. 3, 2001

(54) OPTICAL SCANNING APPARATUS AND DEVICES INCLUDING AN OPTICAL SCANNING APPARATUS

(75) Inventor: Kazumi Tabuchi, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/025,031

(22) Filed: Feb. 18, 1998

(30) Foreign Application Priority Data

Feb. 18, 1997 (JP) .................................................. 9-033612

(51) Int. Cl.[7] ........................................................ B41J 2/435
(52) U.S. Cl. .......................... 347/248; 347/234; 347/235; 347/250
(58) Field of Search .................................. 347/132, 234, 347/235, 248, 250; 358/502, 296; 320/120; 250/235

(56) References Cited

U.S. PATENT DOCUMENTS

| 4,062,061 | 12/1977 | Batchelor et al. ...................... 714/47 |
| 4,719,515 | 1/1988 | Miyagawa et al. ................... 358/413 |
| 4,763,241 | * 8/1988 | Egawa et al. .......................... 347/235 |
| 5,053,619 | * 10/1991 | Arimoto ................................. 250/235 |
| 5,086,223 | 2/1992 | Hidaka .................................. 250/235 |
| 5,249,060 | * 9/1993 | Ishikawa et al. ..................... 347/132 |
| 5,638,191 | * 6/1997 | Torisawa et al. ..................... 358/502 |
| 5,744,936 | * 4/1998 | Kawakami ............................ 320/120 |
| 5,745,154 | * 4/1998 | Nishizawa ............................ 347/250 |
| 5,821,977 | * 10/1998 | Nishimura ............................ 347/248 |

FOREIGN PATENT DOCUMENTS

| 0 375 434 | 6/1990 | (EP) . |
| 0 581 083 A1 | 2/1994 | (EP) . |
| 0 598 600 A2 | 5/1994 | (EP) . |
| 0 691 783 | 1/1996 | (EP) . |
| 3-48511 B2 | 7/1991 | (JP) . |
| 04149510 | * 5/1992 | (JP) .............................. G02B/26/10 |

OTHER PUBLICATIONS

Curry D N: Polygon Laser Scanner Fast Scan Spatial Linearity Correction Proceedings of the International Congress on Advances in Non Impact Printing Technologies, Orlando, 10/90, No. Congress 6 pp. 979–985, XP000222273 Nash R J.

* cited by examiner

Primary Examiner—N. Le
Assistant Examiner—Hai C. Pham
(74) Attorney, Agent, or Firm—Nixon & Vanderhye P.C.

(57) ABSTRACT

The present invention has been made for the purpose of obtaining an optical apparatus which avoids the necessity for changing a control unit for appropriate control of a light source or making a modification to the control unit even when the type and specifications of the optical apparatus are changed, whereby costs for designing the control unit may be reduced. In the case where a comparative table stores therein LEND signal times and data starting times respectively corresponding SYNC signal periods of three apparatuses of different types, a CPU searches for a SYNC signal period coincident with the measured SYNC signal period from among the SYNC signal periods which are stored in the comparative table, and executes control of signals for an optical unit by using the obtained LEND signal time and data starting time corresponding to the searched SYNC signal period.

28 Claims, 11 Drawing Sheets

OPTICAL SCANNING APPARATUS AND DEVICES INCLUDING AN OPTICAL SCANNING APPARATUS

BACKGROUND OF THE INVENTION

1. Field of the Invention

The present invention relates to an optical apparatus used in a laser printer in which image forming is performed by irradiating a laser beam which has been modulated based on image information through a scanning mirror onto a surface of a photosensitive body.

2. Description of the Prior Art

A known optical apparatus for scanning light such as a laser beam through a scanning mirror is used in a laser printer in which an image is formed by electrophotographic method in which a laser beam modulated based on an image data is scanned onto a photosensitive body surface. As shown in FIG. 8 in the interior of a main body 101 of the laser printer, a laser beam irradiated by a laser irradiating unit 123 is transmitted onto a surface of a photosensitive body drum 108 through a scanning mirror 121 and reflecting mirrors 122a to 122c. The photosensitive body drum 108 is supported in an approximately central portion of the main body 101 so as to be rotatable. The scanning mirror 121 is driven by a mirror motor 120 so as to rotate, and scans the laser beam irradiated by the laser irradiating unit 123 in a main scanning direction of the photosensitive body drum 108, that is, a direction parallel to a rotating axis of the photosensitive body drum 108. The surface of the photosensitive body drum 108 is uniformly charged with electric charge of single polarity by an electrification unit 114 prior to the transmission of the laser beam, and forms an electrostatic latent image through a photoconductive phenomenon by the laser beam modulated based on the image data. Toner in a developing vessel 116 is supplied to this electrostatic latent image from a developing roller 115 whereby the electrostatic latent image is clarified into a toner image.

On the other hand, in the interior of the main body 101 is formed a paper delivery path 113 which extends from a paper feeding tray 117 through an interval between the photosensitive body drum 108 and a transferring roller 109 and through a fixing device 110 to a paper discharge tray 118. There are arranged, within this paper delivery path 113, a paper feeding roller 103, a paper sensor 107, delivery rollers 111, and paper discharge rollers 112. Paper 102 stacked in the paper feeding tray 117 is fed into the paper delivery path 113 by the rotation of the paper feeding roller 103. The fed paper 102 is detected by the paper sensor 107. The toner image of the photosensitive body drum 108 is transferred onto the surface of the paper 102 when the laser irradiating unit 123 irradiates a laser beam based on the detection signal of the paper sensor 107 and the paper 102 is made to pass between the photosensitive body drum 108 and the transferring roller 109 synchronously with the rotation of the photosensitive body drum 108. The toner image transferred onto the surface of the paper 102 is fused and fixed on the surface of the paper 102 by heating and pressurizing operations of the fixing device 110. The paper 102 on which the toner image has been fixed is discharged to the paper discharge tray 118 by the paper discharge rollers 112. After the surface of the photosensitive body drum 108 has faced the paper 102, the surface is cleared of residual toner by means of a cleaner 126 and is thereafter reused for forming electrostatic latent images and toner images.

As shown in FIG. 9, the scanning motor 120, the scanning mirror 121, the reflecting mirrors 122a to 122c (note that the reflecting mirrors 122b and 122c are omitted from the drawing), the laser irradiating unit 123 and a start sensor 124 make up an optical unit 201 in the laser printer. The scanning mirror 121 scans a laser beam from the laser irradiating unit 123 which has been modulated based on the image data while steady-state rotation in a direction shown by arrow CW, driven by the scanning motor 120. The reflecting mirrors 122a to 122c transmit the laser beam which has been scanned by the scanning mirror 121 to the photosensitive body drum 108. The scanned laser beam is further received by the start sensor 124. Upon receipt of the laser beam, the start sensor 124 outputs a SYNC signal. This SYNC signal is used for creating reference timing for outputting image data to the laser irradiating unit 123.

FIG. 10 is a block diagram showing an arrangement of a control unit of the laser printer. The control unit of the laser printer is composed of the optical unit 201, a synthesizing circuit 202, an image data generating circuit 203 and a load device 204, which are connected with a CPU 209 having a ROM 207 and RAM 208 through a interface 205. The optical unit 201 inputs the SYNC signal output by the start sensor 124 to the image data generating circuit 203 and the CPU 209. The CPU 209 creates a LEND signal based on the SYNC signal which is then output to the synthesizing circuit 202. Based on the SYNC signal, the image data generating circuit 203 outputs the image data to the synthesizing circuit 202. The synthesizing circuit 202 outputs a video signal synthesized from the LEND signal and the image data to the laser irradiating unit 123 of the optical unit 201. The laser irradiating unit 123 irradiates a laser beam based on the Video signal.

FIG. 11 is timing charts for each signal of the control unit of the laser printer. The SYNC signal for creating the reference timing for outputting image data to the laser irradiating unit 123 may be, for instance, a low level signal output from a time at which the start sensor 124 receives the laser beam. Therefore, in order to generate the SYNC signal, a laser beam needs to be irradiated from the laser irradiating unit 123. On the other hand, in order to accurately reproduce image data by using the photosensitive body drum 108, only the laser beam modulated by the image data should be transmitted to the surface of the photosensitive body drum 108. For this purpose, the CPU 209 sets the LEND signal, which is output to the synthesizing circuit 202 during a period of time TA beginning shortly time t1 at which the SYNC signal has been input until time t2, to "H". This period of time TA is sufficient for the laser beam to cross the photosensitive body drum 108 in an axial direction.

The image data generating circuit 203, on the other hand, starts output of image data to the synthesizing circuit 202 at time t3 when a period of time TB has elapsed after time t1 at which the SYNC signal has been input. This period of time TB is a period of time in which an irradiating position of a scanning light of the laser beams moves from a position at which the light is received by the start sensor 124 to a position at which the light faces the photosensitive body drum 108. The Video signal synthesized from the LEND signal and the image data is output from the synthesizing unit 202 to the laser irradiating unit 123. It should be noted that the laser irradiating unit 123 terminates irradiation of a laser beam when the Video signal is "H" and irradiates a laser beam when the Video signal is "L".

In this manner, a Video signal of level "L" is input into the laser irradiating unit 123 for continuously irradiating a laser beam within a specified period of time when the laser beam is irradiated at a position at which it is received by the start sensor 124. On the other hand, when the laser beam is irradiated at a position at which it faces the photosensitive body drum 108, the LEND signal is set to "H" level and the Video signal corresponding to the image data is input to the laser irradiating unit 123 so that a laser beam modulated based on the image data is irradiated onto the surface of the photosensitive body drum 108. Such control of signals which are input to a light source of the laser irradiating unit or the like is similarly performed not only for laser printers but also for optical apparatuses using scanning light such as a position measuring apparatus.

In the above-described conventional optical apparatus, lapse of time is measured starting from a time at which the scanning light has been irradiated to a reference position which may be, for instance, an irradiating position at which it is received by the start sensor, and an irradiating position of the scanning light is determined from this measured lapse of time in order to supply a signal to the light source of the scanning light according to the irradiating position of the scanning light. A period of time, at which the irradiating position of the scanning light moves from the reference position to a specified position which may be, for instance, a position on the photosensitive body drum, varies in accordance with a distance between the reference position and the specified position, and a scanning speed of the scanning light which is determined by a rotating speed of the scanning mirror. The distance between the reference position and the specified position as well as the rotating speed of the scanning mirror are variable in accordance with the type and specifications of the optical apparatus, and details of the control for the light source such as driving timing for the light source of the scanning light need to be changed in accordance with the specification of the optical apparatus.

For instance, in the case where the rotating speed of the scanning motor used for rotating the scanning mirror in the laser printer is changed without making a modification to a control device, which has been used before changing the rotating speed of the scanning motor, modulation of the laser beam based on the image data starts before or after the laser beam is irradiated onto the surface of the photosensitive drum, so that not only the laser beam which has been modulated based on the image data can not be irradiated onto an accurate position of the photosensitive body drum but also the image formed on the surface of the photosensitive body drum expands or contracts in a direction parallel to the scanning direction of the laser beam with the result that the image is deformed. Further, by a change in the irradiating area of the laser beam, the laser beam is irradiated onto portions of the optical apparatus which are not supposed to be irradiated with the laser beam so that a case may occur in which parts of the laser printer are damaged or heated. Therefore, a drawback was presented in that designs of control units needed to be changed each time the specification of the optical apparatus was varied not only in the case where the type of the optical apparatus is changed but also in the case where the type of the optical apparatus is identical.

Further, in case the rotating speed of the scanning motor is changed due to a breakdown, the light source can not be accurately controlled by a predetermined timing for a control action, and due to the change in the irradiating area of the laser beam, the light beam is irradiated onto portions of the laser printer where are not supposed to be irradiated with the laser beam so that parts of the laser printer may be damaged or heated. It may further be in the laser printer that the laser beam modulated based on the image data can not be irradiated on accurate positions of the photosensitive body drum or the image formed on the surface of the photosensitive drum expands and contracts in a direction parallel to the scanning direction of the laser beam so that the image is deformed.

Another prior art concerning control of an optical apparatus is an information output apparatus disclosed in Japanese Examined Patent Publication JP-B2 3-48511 (1991). This information output apparatus corresponds to an optical unit for irradiating a laser beam onto a photosensitive drum in an electrophotographic process, and a timing for a semiconductor laser element starting output of a laser beam is controlled in order to sent an optical information from a control device to the photosensitive drum in accordance with a beam detecting signal which a beam detector outputs upon detecting a laser beam from the semiconductor laser element.

In the case where the beam detector is made to detect a laser beam, the control apparatus makes the semiconductor laser element start continuous output of a laser beam at a time which is set back by a time required for stabilizing an amount of light of the laser beam which is output by the semiconductor laser element from a time at which the beam detector should detect the laser beam in order to prevent generation of a jitter. In this information output apparatus, since a case where the control apparatus is made to control a plurality of optical apparatuses whose arrangements differ each other, has not been taken account of, no concrete arrangements for this purpose are shown therein. Therefore, signals for controlling the semiconductor laser element generated based on signals output by the beam detector always remain the same so that the design of the control device is required to be changed when the arrangement of the optical apparatus to be controlled thereby is changed.

SUMMARY OF THE INVENTION

An object of the present invention is to provide an optical apparatus which enables accurate control of a light source by one and the same single control unit even when the type or specifications of the optical apparatus are changed, without changing the design of the control unit so as to correspond to the type or specifications of the optical apparatus, whereby designing costs may be reduced.

Another object of the present invention is to provide an optical apparatus which can be prevented from being damaged or heated due to a change in irradiation area of a laser beam in the event of failure.

In a first aspect of the invention, an optical apparatus comprises scanning means for scanning light irradiated from a light source to an object to be scanned at predetermined scanning periods in a predetermined direction; reference timing signal generating means for generating a reference timing signal upon receiving the light which has been scanned by the scanning means; control means for setting a driving timing for the light source based on the reference timing signal generated by the reference timing signal generating means, the optical apparatus further comprising memory means for previously storing a relationship between a period of the reference timing signal generated by the reference timing signal generating means and the driving timing for the light source, wherein the control means measures the period of the reference timing signal generated by the reference timing signal generating means and sets the driving timing for the light source based on the measured period of the reference timing signal and the relationship stored in the memory means.

According to the first aspect of the invention, the period of the reference timing signal generated by the reference timing signal generating means upon receiving the scanning light is measured as a scanning period of the scanning means, and the driving timing for the light source is set based on a measurement result and the previously stored relationship. Therefore, even when the scanning period of the scanning means is changed, the light source is driven by the same control means at a driving timing corresponding to the varied scanning period.

Further, even when the scanning period of the scanning means is changed, the light source is driven by the same control means at a driving timing corresponding to the changed scanning period. Accordingly it is not necessary to make a modification in design to the control means even when the type of the optical apparatus is changed or an alteration is made to the specifications of the optical apparatus. Furthermore even in case where a variation of the scanning period of the scanning means has occurred, the driving timing for the light source may be set in accordance with the period of an occasional reference timing signal.

In a second aspect of the invention, a modulation signal for controlling light irradiation is applied to the light source, and the driving timing set by the control means is composed of a first timing for terminating irradiation of light for scanning the reference timing signal generating means and a second timing for starting irradiation of information light for scanning the object to be scanned.

According to the second aspect of the invention, the timing for terminating irradiation of light for scanning the reference timing signal generating means and the timing for starting irradiation of information light which includes information and which is for scanning the object to be scanned based on the period of the reference timing signal which has been measured as a scanning period for the scanning means. With this arrangement, even when the scanning period of the scanning means is changed, the optical apparatus used in an image forming apparatus in which an information light which has been modulated based on image information or the like is irradiated onto an object to be scanned such as a photosensitive body is capable of controlling the irradiation of light for scanning the reference timing signal generating means and the irradiation of information light for scanning the object to be scanned at a timing which corresponds to the changed scanning period by using the same control means. Therefore, the optical apparatus used in the image forming apparatus can correspond to changes in types or specifications by a single control means.

In a third aspect of the invention, the memory means stores a plurality of predetermined periods, and driving timings in which the period of the reference timing signal coincides with one of the stored periods, as a relationship between the period of the reference timing signal and the driving timing for the light source in a respectively corresponding manner, and the control means reads out a driving timing corresponding to one of the plurality of periods stored in the memory means which is identical with the measured period of the reference timing signal, and sets the read out driving timing as a driving timing for the light source.

According to the third aspect of the invention, the control means of the optical apparatus sets a driving timing corresponding to one of the plurality of periods stored in the memory means which is identical with the measured period, as a driving timing for the light source as mentioned above. Therefore, when the arrangement and behavior of the optical apparatus or the type and specifications of equipment employing the optical apparatus are changed, the changed optical apparatus or the equipment employing the changed optical apparatus can be controlled by using the memory means and the control means by simply rewriting the period and the driving timing stored in the memory means in accordance with the changed optical apparatus or the equipment employing the changed optical apparatus. Therefore, there is no necessity of changing the design of the control means when the arrangement and behavior of the optical apparatus or the type and specifications of the equipment employing the optical apparatus are changed. Accordingly the cost required for designing the optical apparatus can be reduced.

In a fourth aspect of the invention, the control means terminates driving of the light source before the scanning period is stabilized and sets a driving timing for the light source based on a reference timing signal generated by the reference timing signal generating means after the scanning period has been stabilized.

According to the fourth aspect of the invention, driving of the light source is controlled at a driving timing set on the basis of the previously stored relationship and the period of a reference timing signal which has been measured as a scanning period after the scanning period of the scanning means has been stabilized. This arrangement thus prevents the case where the driving timing is set on the basis of a period of the reference timing signal which has been measured while the scanning period of the scanning means has not been stabilized at the stationary condition. With this arrangement, the information light for scanning the object to be scanned is not expanded in the scanning direction due to alterations of the scanning period of the scanning means, and the image forming condition in the image forming device can be properly maintained. The control means according to the fourth aspect of the invention may be applied to the second aspect of the invention whereby the same effects can be obtained as for the fourth aspect of the invention.

In a fifth aspect of the invention, the control means sets the driving timing for the light source only once after the scanning period of the scanning means has been stabilized, and keeps on controlling the light source based on the set driving timing starting from the time at which the driving timing has been set.

As described above, the control means according to the fifth aspect of the invention performs setting of the driving timing for the light source for only one time after the scanning period has been stabilized. With this arrangement, it can be prevented that generation of noises originated in the scanning motor within the scanning means causes erroneous measurement of the period of the reference timing signal and consequently driving timings are erroneously set. Therefore, malfunctions of the light source originated in the generation of noises can be reliably prevented.

In a sixth aspect of the invention, the control means continuously measures the period of the reference timing signal after the stabilization of the scanning period, and an error process is performed in the case where the measured value is not coincident with the period of the reference timing signal which has been used for the setting of the driving timing in the stable scanning period.

According to the sixth aspect of the invention, an error process is performed when the period of the reference timing signal continuously measured in the stationary condition does not coincide with the period of the reference timing signal which has been used for the setting of the driving timing. Accordingly the error process is performed when the scanning period has been altered after the stationary condition of the scanning period has once been obtained. With this arrangement, the occurrence of error within the optical apparatus can be quickly and easily identified by the control means. Note that the control means according to the sixth invention may also perform the actions performed by the control means according to the second to fifth inventions whereby the same effects can be obtained as those of the second to fifth inventions.

In a seventh aspect of the invention, the optical apparatus further comprises power supplying means for continuing power supply to the control means over a specified time after the power source has been turned off, and the error process of the control means includes a process in which it is written into nonvolatile memory means that the error process has been performed within the specified time during which the power supply by the power supplying means is continued after the power source has been turned off.

According to the seventh aspect of the invention, in the case where the error process has been performed because the period of the reference timing signal which has been continuously measured in the stationary condition is not coincident with the period of the reference timing signal which has been used for setting the driving timing, that the error process has been performed is written into the nonvolatile memory means within the specified time when power supply is continued after the power source is turned off. With this arrangement, it can be prevented that it is repeatedly written into the nonvolatile memory means that the error process has been performed while the power source is on after the error has occurred, whereby deformation of contents of the nonvolatile memory means which may occur by writing in the nonvolatile memory means an amount of data exceeding the memory capacity can be prevented. Therefore, the error process such as terminating actions of the scanning means until the error is released can be properly performed.

In an eighth aspect of the invention, the power supply means includes:

rectification means for rectifying an electric signal supplied from an alternating-current power source, smoothing means for smoothing the electric signal rectified by the rectification means, binarization means for binarizing the electric signal smoothened by the smoothing means, delay means for delaying the electric signal binarized by the binarization means, noise eliminating means for eliminating noise components of the electric signal delayed by the delay means and supplying the obtained electric signal to the light source and the scanning means, electric signal generating means for generating an electric signal to be supplied to the control means, on the basis of the electric signal binarized by the binarization means, and a condenser interposed between the electric signal generating means and the control means.

According to the eighth aspect of the invention, the power supply means is arranged so as to include each of the above listed means. With this arrangement, the electric signal which is the alternating-current electric power which is supplied from the single alternating-current power source can be converted into a direct-current electric power which is to be supplied to the light source and the scanning means and into a direct-current electric power which is to be supplied to the control means. Further, since the condenser is interposed between the electric signal generating means and the control means, the condenser functions as a power source to further supply electric power to the control means for a specified time after supply of electric signals have been terminated when the alternating-current power source has been turned off. With this arrangement, the control means can be activated after turning the power source off by using the power supply means which is of simple arrangement as described above.

In a ninth aspect of the invention, an optical apparatus comprises:

scanning means for scanning light irradiated from a light source to an object to be scanned at predetermiend scanning periods in a constant direction, reference timing signal generating means for generating a reference timing signal upon receipt of the light scanned by the scanning means, and control means for measuring a period of the reference timing signal generated by the reference timing signal generating means and setting a driving timing for the light source by calculation on the basis of a predetermined relationship between the period of the reference timing signal and the driving timing for the light source as well as of the measured period of the reference timing signal.

According to the ninth aspect of the invention, the control means of the optical apparatus calculates and sets a driving timing for the light source based on the measured period of the reference timing signal. With this arrangement, even when the scanning period of the scanning means is changed, the light source can be driven at a driving timing corresponding to the changed scanning period by using the same control means. Therefore, even when the type and specifications of the optical apparatus and the equipment employing the optical apparatus are changed, there is no need to change the design of the control means. Accordingly costs required for the designing can be reduced. Furthermore, when the scanning period of the scanning means is changed, the driving timing for the light source can be set in accordance with the prevailing period of the reference timing signal. The light source can be controlled in accordance with the prevailing period of the reference timing signal also, for instance, in a rising period of the scanning motor of the scanning means. Note that the optical apparatus according to the ninth invention may additionally include the power supply means according to the eighth invention, and the control means of the optical apparatus according to the ninth invention may perform the same processes as performed by the control means according to the second invention and the fourth to seventh inventions.

In a tenth aspect of the invention, an electrophotographic type printer comprises a photosensitive body and optical means for irradiating a surface of the photosensitive body with the laser beam modulated based on a signal showing an image to be printed, wherein the optical means includes:

a light source for outputting the laser beam; scanning means for scanning the laser beam to the surface of the photosensitive body at predetermined scanning periods in a constant direction;

reference timing signal generating means for generating a reference timing signal upon receiving the light beam scanned by the scanning means;

memory means for storing a predetermined relationship between a period of the reference timing signal and a driving timing of the light source; and control means for measuring the period of the reference timing signal generated by the reference timing signal generating means, setting the driving timing for the light source based on the obtained period of the reference timing signal and the relationship stored in the memory means, and for controlling output and stoppage of the laser beam from the light source based on the set driving timing.

According to the tenth aspect of the invention, the printer comprises optical means identical to the optical apparatus according to the first aspect of the invention. With this arrangement, even when the type and specifications of both the optical means and the printer have been altered, the driving timing for the light source is set in accordance with the alterations in type and specification so that the light source is controlled at this driving timing. Therefore, there is no need to change the design of the control means when the arrangements and specifications of both the optical means and the printer are changed, whereby costs required for the change of the design may be reduced. Furthermore when the optical apparatus of the second to ninth aspects of the invention are employed as the optical means of the printer, the printer can attain the effects of the optical apparatus.

In an eleventh aspect of the invention, an image irradiating apparatus comprising a screen which is irradiated with a laser beam to display an image and optical means for irradiating a surface of the screen with the laser beam modulated based on a signal showing the image to be displayed, wherein the optical means includes:

a light source for outputting the laser beam;

scanning means for scanning the laser beam toward the screen in a specified direction at predetermined scanning periods in a constant direction;

reference timing signal generating means for generating a reference timing signal upon receipt of the laser beam scanned by the scanning means;

memory means for storing a predetermined relationship between a period of the reference timing signal and a driving timing of the light source; and control means for measuring the period of the reference timing signal generated by the reference timing signal generating means, setting the driving timing of the light source based on the measured period of the reference timing signal and the relationship stored in the memory means, and controlling output and stoppage of the laser beam from the light source based on the set driving timing.

According to the eleventh aspect of the invention, the image irradiating apparatus comprises an optical apparatus identical to that according to the first aspect of the invention as optical means. Thus for the same reason as that concerning the printer according to the tenth aspect of the invention, the cost of changing the design for the controlling means can be reduced even when structures and specifications of both the optical means and the image irradiating apparatus are changed.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Figure 1:
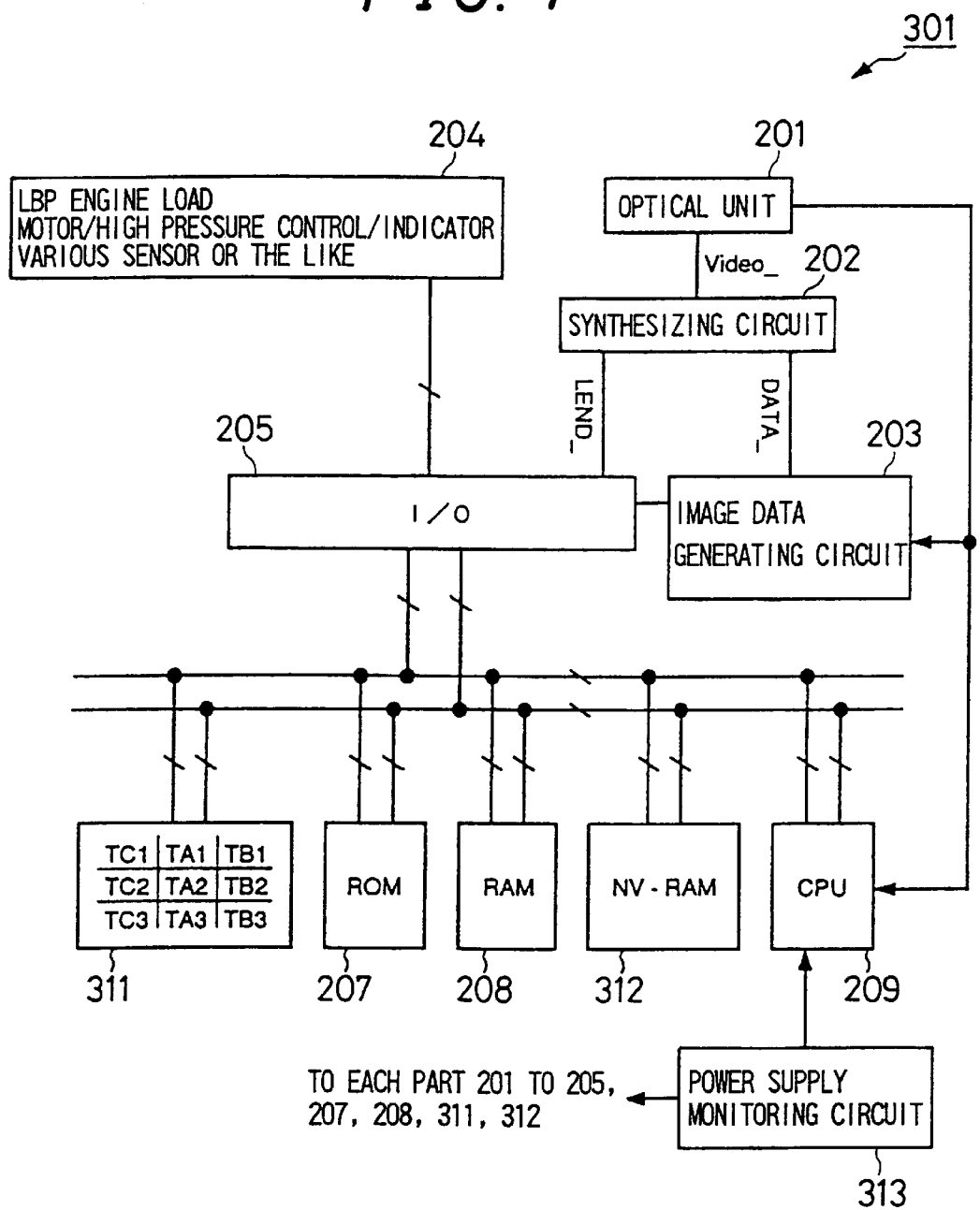
FIG. 1 is a block diagram showing an arrangement of a control unit of an optical apparatus of an embodiment of the present invention.

Now referring to the drawings, preferred embodiments of the invention are described below.

Figure 10:
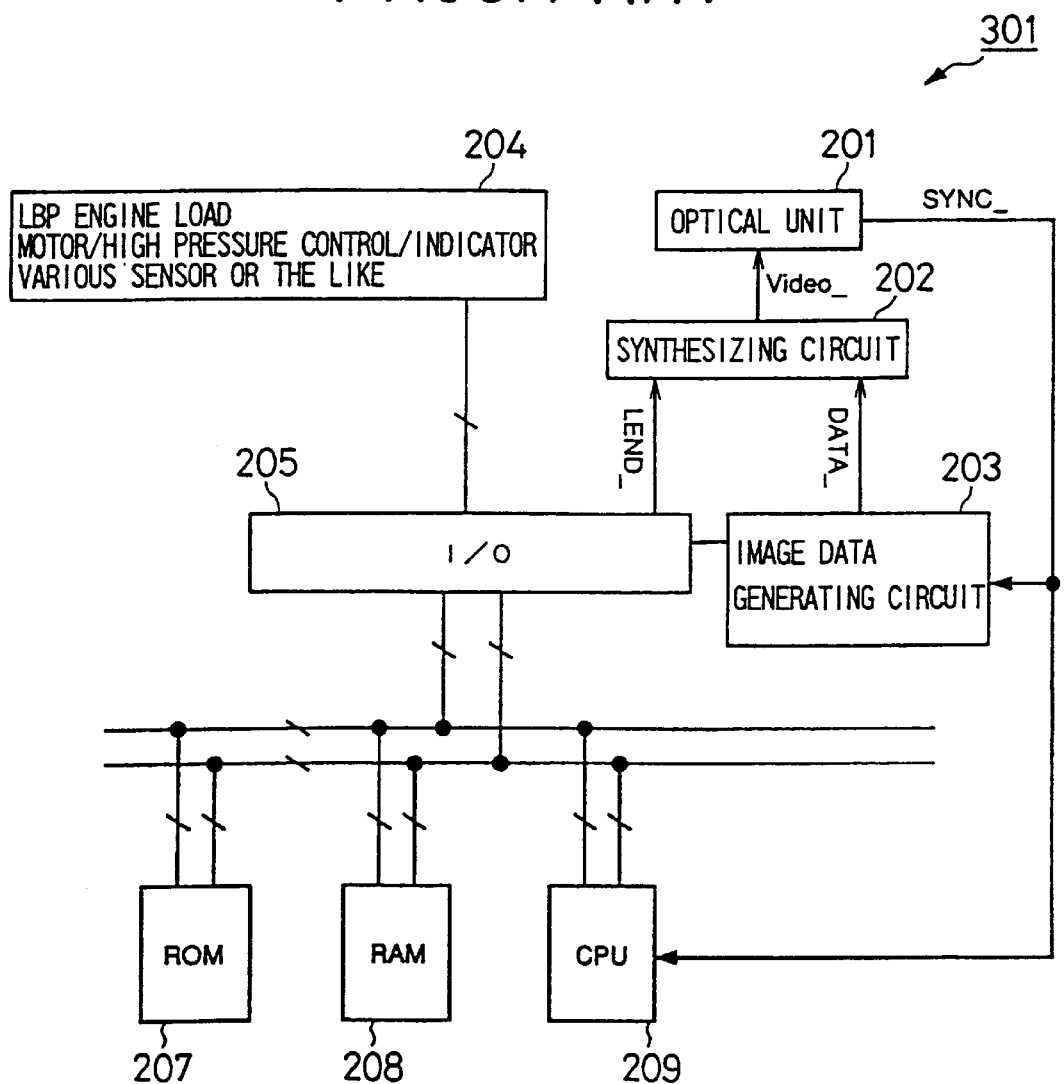
FIG. 10 is a block diagram showing an arrangement of a control unit included in the laser printer.
Figure 11:
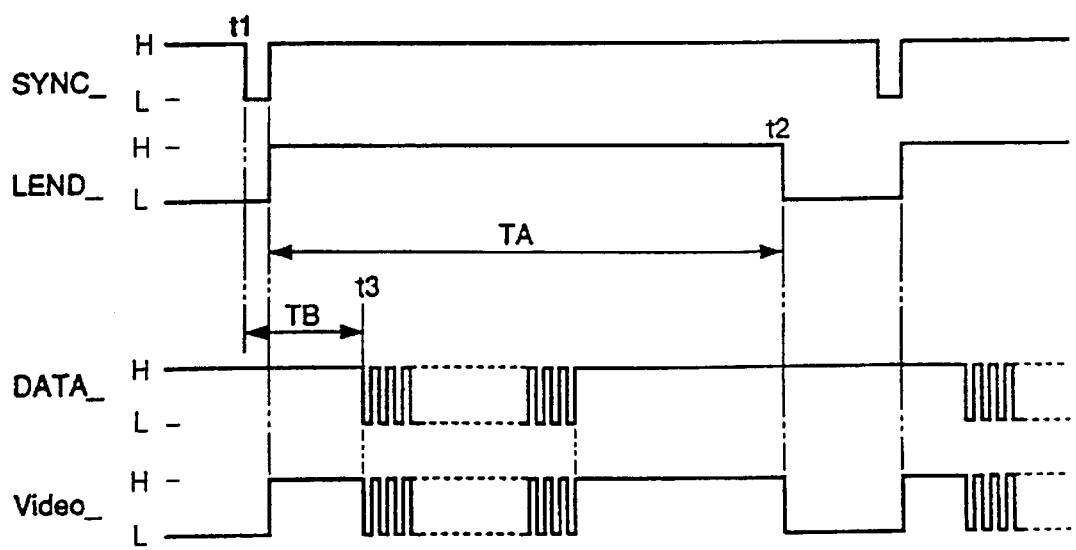
FIG. 11 indicates timing charts showing conditions of signals of portions of the control unit.

FIG. 1 is a block diagram showing an arrangement of a control unit of an optical apparatus of a first embodiment according to the present invention. Portions of a control unit 301 as indicated in the block diagram of FIG. 1 which are identical with those of a conventional control unit as shown in FIG. 10 are marked with the same reference numerals and explanations will be omitted. The control unit 301 as shown in FIG. 1 differs from the conventional control unit in that a CPU 209 is equipped with a comparative table 311, NV-RAM 312 and a power supply monitoring circuit 313. The comparative table 311 stores therein relationship between output time intervals C1 to C3 of SYNC signals which are output from an optical unit 201 and control timing TA1 to TA3 and TB1 to TB3 for each of the signals to be controlled by the CPU 209 for each of a plurality of optical apparatuses to which the control unit 301 is applied. The NV-RAM 312 fixedly stores therein data concerning error process which will be described later. The power supply monitoring circuit 313 maintains power supply for the CPU 209 in order to perform a specified process after the power source has been turned off.

The comparative table 311 and the NV-RAM 312 are connected to the CPU 209 through a bus line so that they are respectively capable of sending and receiving data and signals between the CPU 209. The power supply monitoring circuit 313 is equipped with a first output terminal for supplying electric power to the CPU 209 and a second output terminal for supplying electric power to remaining parts 201 to 205, 207, 208, 311, and 312 other than the CPU 209, and separately supplies electric power to the CPU 209 and the remaining parts 201 to 205, 207, 208, 311, and 312.

Figure 9:
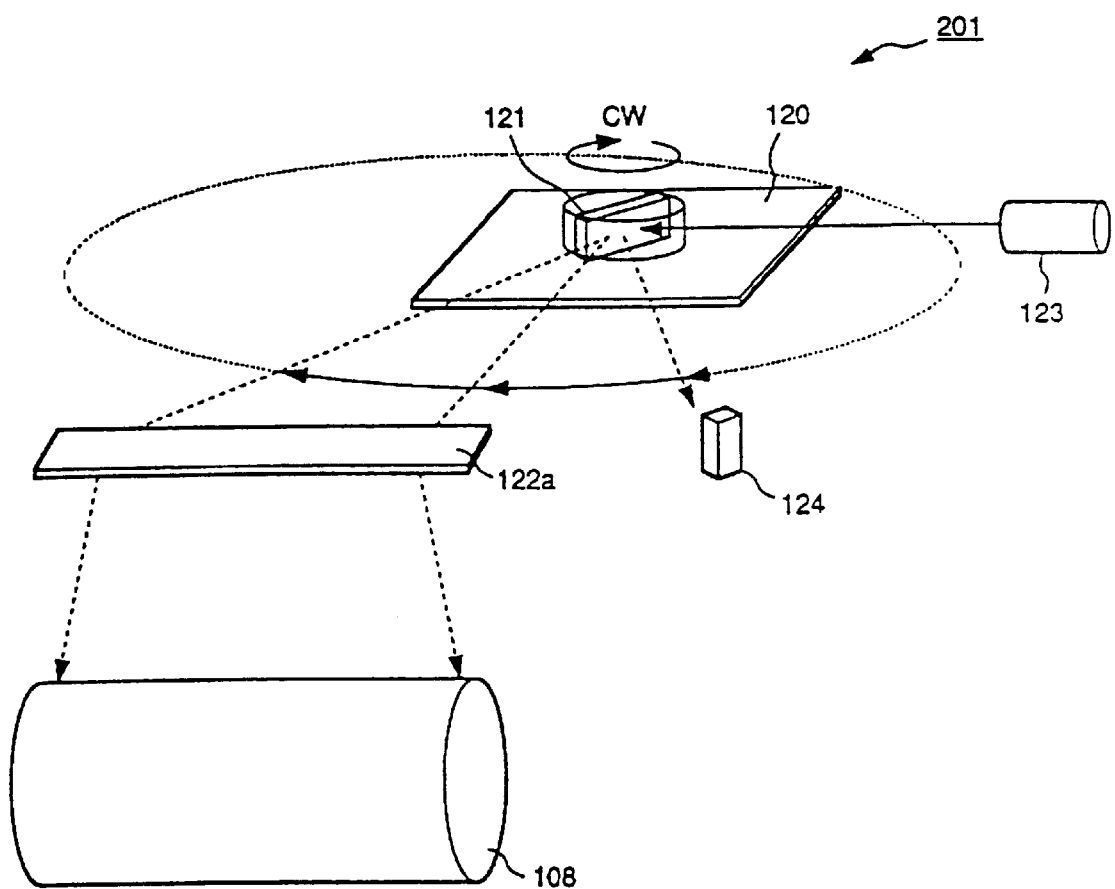
FIG. 9 is a diagram showing an arrangement of an optical unit included in the laser printer.

An arrangement of the optical apparatus according to the first embodiment including this control unit 301 may be identical with that of the prior art optical apparatus as shown in FIG. 9. Behavior of the optical apparatus according to the first embodiment are identical with that of the prior art optical apparatus except for that related to the control unit 301. Therefore, explanations of the arrangement and behavior of the optical apparatus according to the first invention which are identical with those of the prior art optical apparatus will be omitted. Further, in an explanation of this embodiment, parts having the same arrangement and behavior which are identical with those of the prior art are marked with the same numerals and explanations thereof will be omitted.

Figure 2:
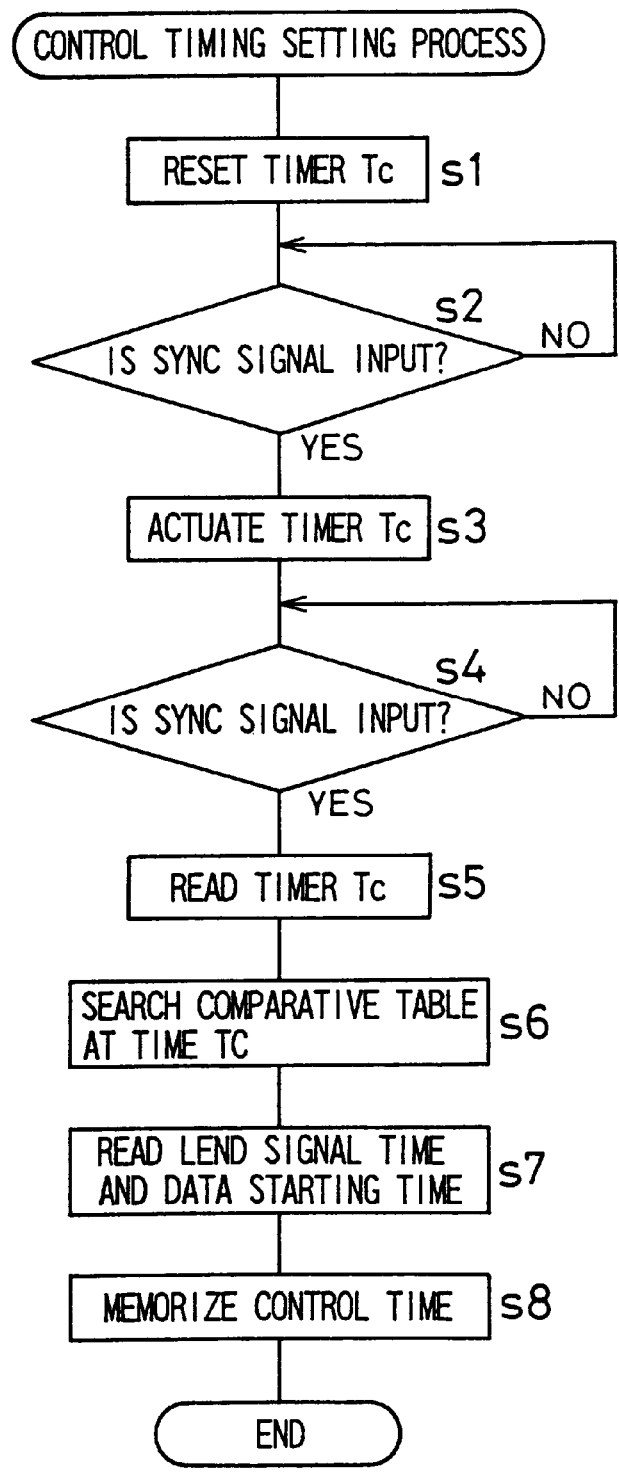
FIG. 2 is a flowchart showing a part of process steps performed in the control unit of the optical apparatus.

FIG. 2 is a flowchart showing process steps for setting a control timing performed in the control unit of the optical apparatus. A CPU 209 first resets a timer Tc which is allotted in part of a memory area of a RAM 208 (s1), and awaits input of a SYNC signal from a start sensor 124 (s2). Upon input of the SYNC signal, the CPU 209 actuates the timer Tc (s3) and then reads a time measured by the timer Tc upon input of the SYNC signal (s4, s5). Next, the CPU 209 searches for the comparative table 311 according to the time measured by the timer Tc (s6) and reads out a LEND signal time and a data starting time which correspond to the measured time of the timer Tc (s7). The CPU 209 stores the LEND signal time and data starting time which have been read out from the comparative table 311 in the RAM 208 (s8).

The LEND signal time indicates time elapsed between a time t1 at which the SYNC signal has been switched from high level to low level and a time t2 at which the LEND signal is switched from high level to low level. The data starting time indicates time elapsed between the time t1 and a time t3 at which output of image data is started.

Figure 3A:
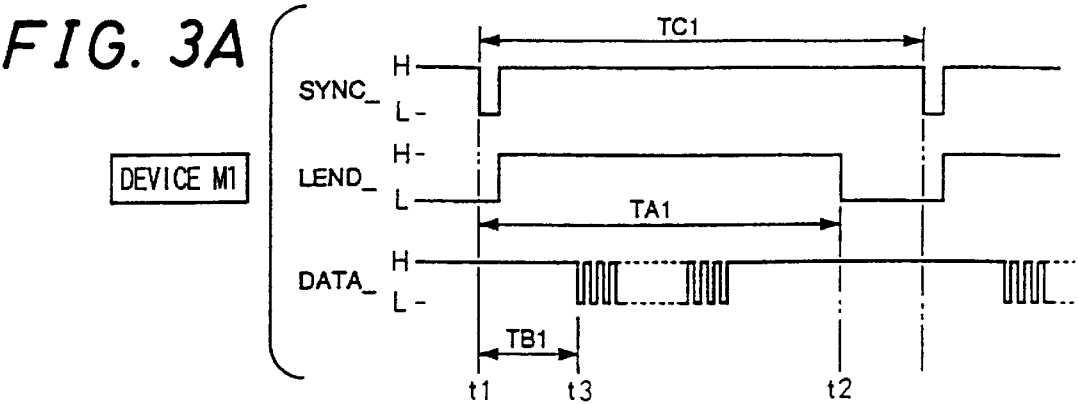
FIG. 3A to FIG. 3C are diagrams showing examples of the process steps performed in the control unit of the optical apparatus.
Figure 3B:
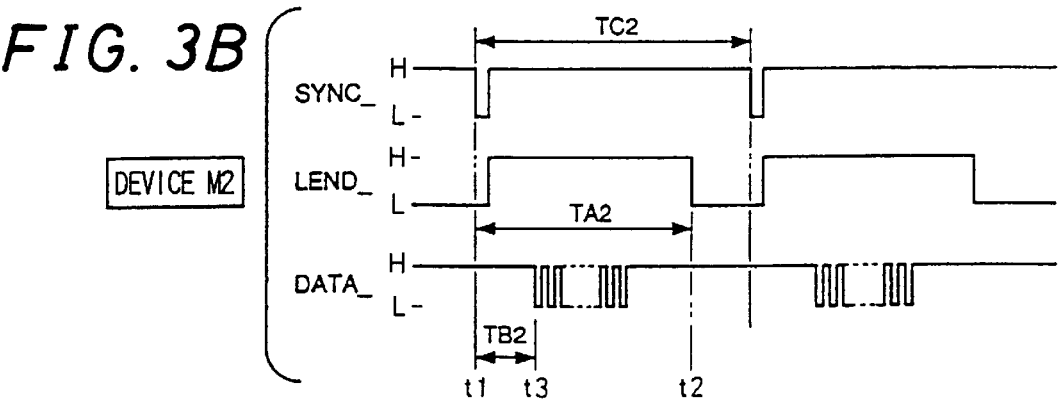
Figure 3C:
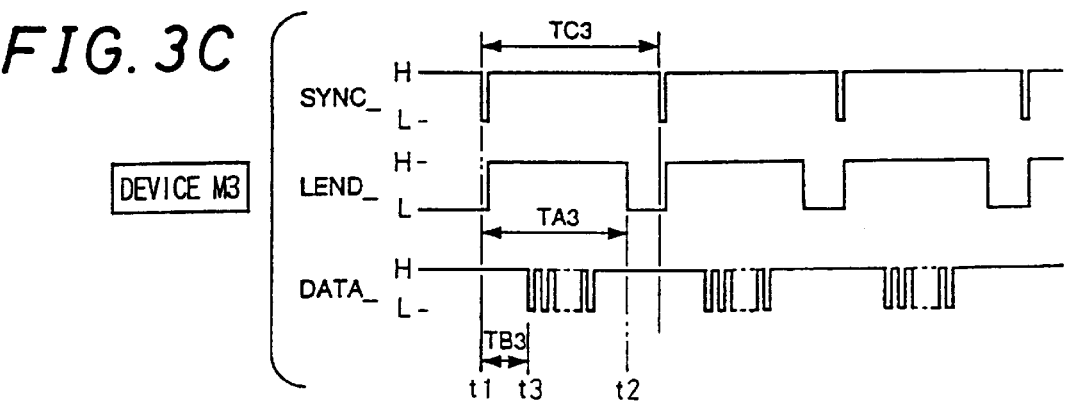

By the above process, the CPU 209 times with the timer Tc a SYNC signal period TC which is output from the optical unit 201 and sets the LEND signal time and data starting time which correspond to the measured SYNC signal period TC as a control timing. For instance, in the case where the comparative table 311 stores therein LEND signal times TA1 to TA3 and data starting times TB1 to TB3 corresponding to the respective SYNC signal periods TC1 to TC3 of three types of apparatuses M1 to M3 as shown in FIG. 3, the CPU 209 searches for a SYNC signal period among the SYNC signal periods TC1 to TC3 stored in the comparative table 311 by the process steps for setting the control timing, which is coincident with the measured SYNC signal period TC, and performs control of signals for the optical unit 201 by using the obtained LEND signal time and data starting time corresponding to the SYNC signal period.

Figure 4A:
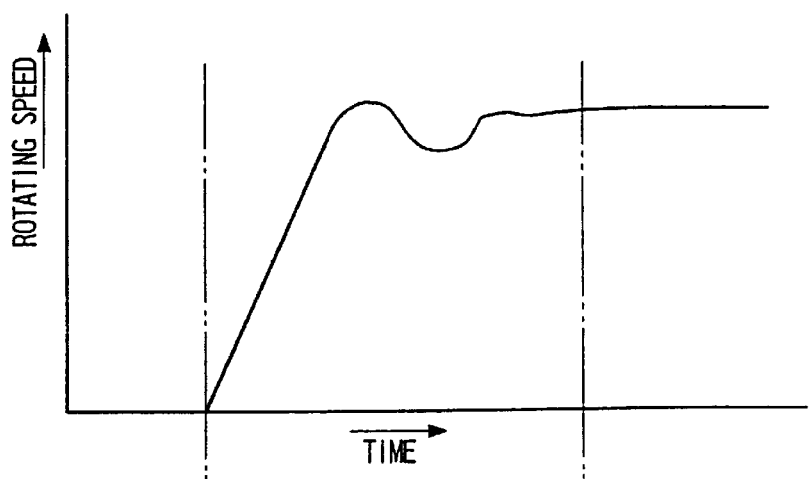
FIGS. 4A and 4B are diagrams showing a relationship between a rising condition of a rotating speed of a scanning motor of the optical apparatus and a timing for a signal to be output to a laser irradiating unit of the optical apparatus.

The LEND signal time and the data starting time are generally proportional to the SYNC signal period. Therefore, the comparative table 311 may be replaced by calculating means for calculating the LEND signal time and the data starting time by the SYNC signal period. In this case, even when the SYNC signal period is changed due to an alteration in the rotating speed of the scanning motor within the same apparatus, the optical unit 201 is controlled by a LEND signal time and data starting time which correspond to the changed SYNC signal period. For instance, when a PMD signal, which is output from the CPU 209 to a driving circuit of the scanning motor 120 at the time of printing actuation as shown in FIG. 4A, is set to "H" level, the scanning motor 120 gradually increases its rotating speed from a terminated condition up to a stable condition of the specified stationary rotating speed, wherein the optical unit 201 can be controlled by a LEND signal time and data starting time in accordance with each SYNC signal period also during a rising period PB of the scanning motor 120.

In apparatuses such as a laser printer in which a laser beam which has been modulated by image data is irradiated onto a photosensitive body drum, it is required to change not only the LEND signal time and the data starting time in accordance with each SYNC signal period but also a time axis of the image data in accordance with each SYNC signal period. However, during the rising period PB in which the changing rate of the rotating speed of the scanning motor 120 is large and in which a difference between an actual rotating speed and the steady-state rotating speed at each point of time is large, a process of image data may not be performed in time or the time axis of the image data needs to be compressed beyond a resolution of the laser beams whereby it becomes difficult to accurately reproduce the image.

Figure 4B:
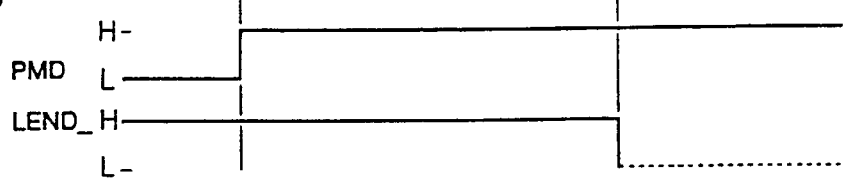

To cope with this problem, as shown FIG. 4B, the CPU 209 sets a PMD signal which is supplied to the driving circuit of the scanning motor to "H" level and waits thereafter for the period PB to elaspe which is sufficient for the rotating speed of the scanning motor 120 to reach the steady-state rotating speed whereupon the LEND signal to be output to a laser irradiating unit (optical unit) 201 through a synthesizing device 202 is set to "L" level. With this arrangement, irradiation of the laser beam can be prevented during the rising period PB for the rotating speed of the scanning motor 120, and the optical unit 201 based on the LEND signal time and data starting time in accordance with the measured SYNC signal period is controlled only during a period in which the scanning motor 120 is rotating at the steady-state rotating speed, whereby reproducibility of the image formed by the laser beam can be kept high.

Further, even in the case where the time axis of the image data can be changed without any problems during the rising period PB for the rotating speed of the scanning motor 120, noise may be generated by static electricity or the like in a signal circuit of a start sensor while the scanning motor 120 is performing a steady-state rotation, and when the CPU 209 performs setting of a control timing upon an erroneously judgement that this noise be a SYNC signal, the optical unit 201 may be controlled at an erroneous control timing.

With this drawback in mind, by setting a control timing only once during the steady-state rotating period PC of the scanning motor 120, and by performing control of the optical unit 201 thereafter at this control timing which has been thus set, malfunctions due to noise can be reliably prevented.

It can be detected that the scanning motor 120 has reached a steady-state rotating condition when no changes are existing in the values measured at each minute time interval of the SYNC signal period and in the case where a motor outputs a rotation stabilization signal when it has reached the stationary rotating condition is employed as the scanning motor 120, it can be detected by the rotation stabilization signal which is output from the scanning motor 120 that it has reached the stationary rotating condition.

The NV-RAM 312 and power supply monitoring circuit 313 may be omitted in order to simplify the arrangement of the above-described optical apparatus according to the first embodiment.

The following is an explanation of a control unit of an optical apparatus according to a second embodiment. An electric arrangement of the control unit of the optical apparatus according to the second embodiment is identical with an electric arrangement of the control unit 301 of the optical apparatus according to the first embodiment. Further, a mechanical arrangement of the optical apparatus according to the second embodiment may be identical with, for instance, a mechanical arrangement of a prior art optical apparatus as shown in FIG. 9. The actions performed by the optical apparatus according to the second embodiment are identical with the actions performed by the prior art optical apparatus except for the actions performed by the control unit. Therefore, explanations of arrangements and actions of the optical apparatus according to the second embodiment which are identical with those of the optical apparatus according to the first embodiment and those of the prior art optical apparatus will be omitted. Further, parts having arrangements and actions which are identical with those of the prior art or those of the first embodiment are marked with the same numerals in explanations hereafter.

Figure 5:
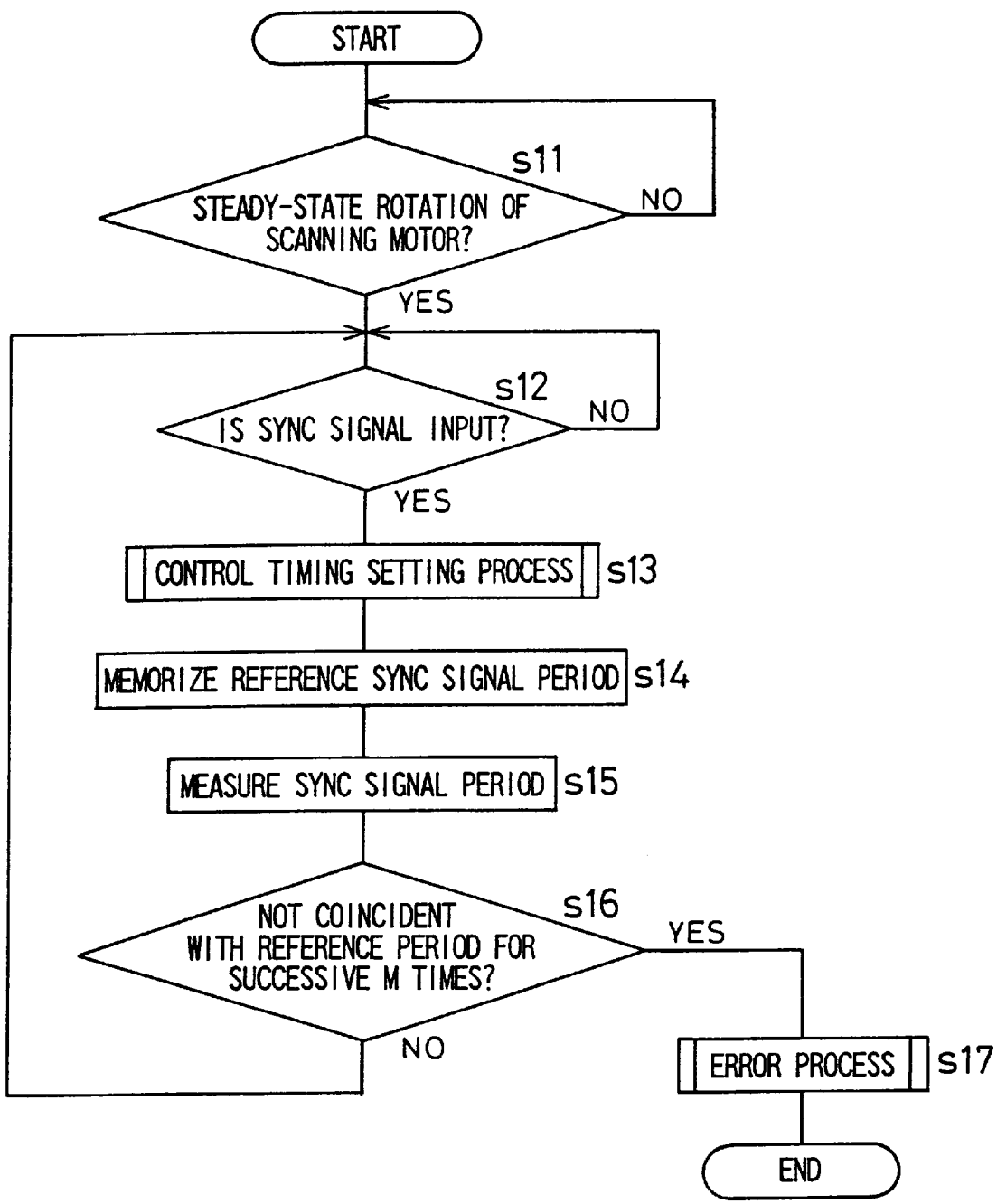
FIG. 5 is a flowchart showing another example of the process steps performed in the control unit of the optical apparatus.

FIG. 5 is a flowchart showing the process steps of the control unit of the optical apparatus according to the second embodiment of the present invention. The CPU 209 of the control unit sets a control timing each time a SYNC signal is input after the scanning motor 120 has reached a steady-state rotating condition (s11 to s13), and stores a SYNC signal period which has been measured at this time as a reference SYNC signal period (s14). Thereafter, the CPU 209 keeps on measuring the period of the SYNC signal which is input from the optical unit 201 (s15) and compares each of the obtained values with the reference SYNC signal period (s16). In the case where the measured value of the SYNC signal period does not successively coincide with the reference SYNC signal period for a specified number of times in this comparison, the CPU 209 judges that the optical unit 201 is out of order and performs an error process (s17).

When the obtained value of the SYNC signal period successively coincides with the reference SYNC signal period for the specified number of times, the process returns to from step s16 to step s12. The process of steps s12 to s16 are repeated until it is judged in step s16 that the obtained value of the SYNC signal period does not successively coincide with the reference SYNC signal period for the specified number of times. After completion of the error process in step s17, the process according to a flowchart of FIG. 5 is completed. The control timing setting process of step s13 which has been explained above is identical with the above-explained control timing setting process of FIG. 2.

The CPU 209 performs error process as explained in FIG. 5 for following two reasons. First, in the case where setting of the control timing is repeatedly performed in the steady-state rotating condition of the scanning motor 120, control of the optical unit 201 is performed, even in case the SYNC signal period is altered due to a breakdown of the optical unit 201, on the basis of the LEND signal time and data starting time in accordance with the altered SYNC signal period. Therefore, in the case where the image data is corrected in accordance with the alteration in the SYNC signal period, an image forming condition which is a result of the control of the optical unit 201 does not change, whereby it becomes difficult to identify an occurrence of breakdown of the optical unit 201 from the image forming condition.

Furthermore, in the case where setting of the control timing is performed only once in the steady-state rotating condition of the scanning motor 120, the optical unit 201 can not be controlled in an ordinary manner depending on the LEND signal time and data starting time which have been set in the above setting process for the control timing when the SYNC signal period has been altered thereafter due to a breakdown of the optical unit 201, whereby the irradiating area of the laser beam changes so that the laser beam is irradiated onto portions which are not supposed to be irradiated, and may cause the optical apparatus to be damaged or heated. Moreover, laser beams can not be irradiated onto accurate portions of the photosensitive body drum or the image formed on the surface of the photosensitive body drum expands or contracts in a scanning direction of the laser beams so that the image is deformed.

From the above reasons, the optical apparatus of the present invention is made to perform the processes shown in FIG. 5 whereby not only occurrence of a breakdown in the optical unit 201 can be quickly and easily identified by detecting occurrence of the breakdown in the optical unit 201 based on alterations of the SYNC signal period and rapidly performing the error process but also damages and heating of the apparatus can be prevented.

Such error process may be performed, for instance, by indicating the occurrence of an error together with details of the error on an indicator included in an LBP engine load 204 or terminating actions of the LBP engine load 204 including/excluding the indicator. An alternative way may be to write in the occurrence of an error and details of the error into the NV-RAM 312 and to prohibit actions of the optical unit 201 by the CPU 209 regardless of the on/off condition of the power source until the error is removed by an appropriate maintenance process.

Further, since a number of possible times to write into the NV-RAM 312 is generally limited, contents of the memory may be rewritten when writing is performed so as to exceed this number of possible times. Therefore, if the CPU 209 writes the occurrence of an error and details of the error into the NV-RAM 312 each time occurrence of the error is detected by an error detecting process based on the comparison with the reference SYNC signal period, the number of actual times for a writing process easily exceeds the number of possible times to write into the NV-RAM 312, whereby the contents of the memory of the NV-RAM 312 is rewritten so that use of the optical apparatus in a condition in which error has not been removed yet can not be prohibited. Therefore, the CPU 209 may be arranged so as to write the occurrence of an error and details of the error into the NV-RAM 312 only immediately after the power source has been turned off.

Figure 6:
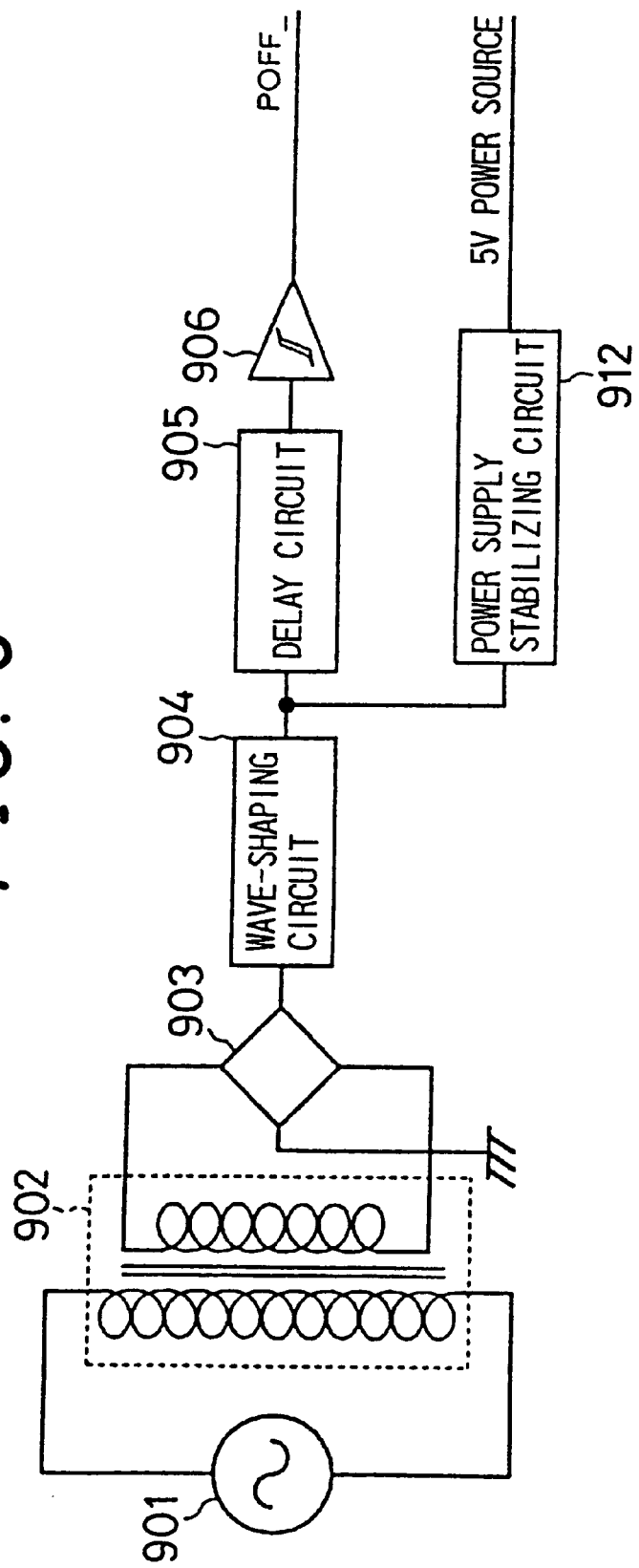
FIG. 6 is a block diagram showing an arrangement of a power supply monitoring circuit provided in the optical apparatus.
Figure 7:
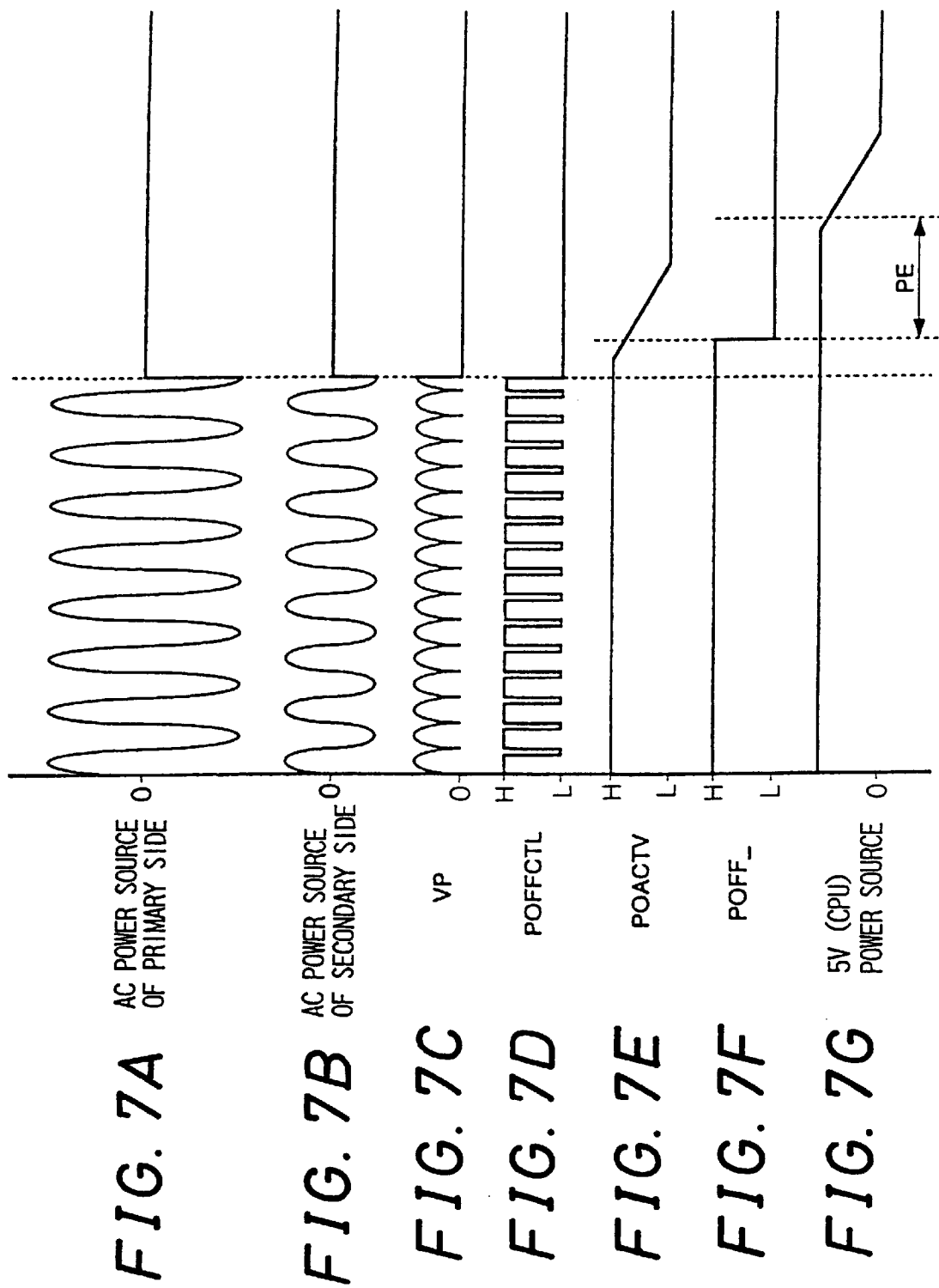
FIG. 7A to FIG. 7G are diagrams showing conditions of signals of each of the units of the power supply monitoring circuit.
Figure 8:
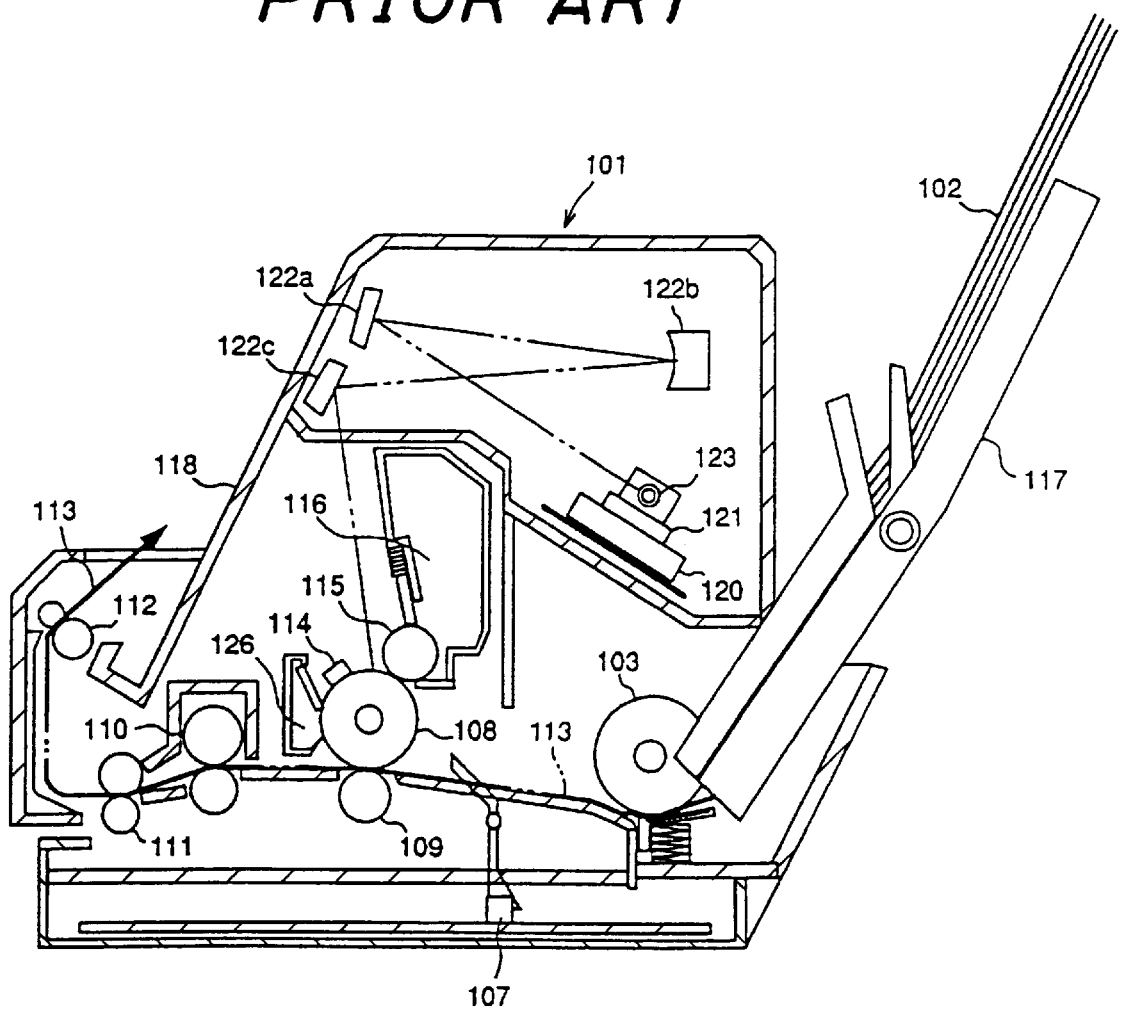
FIG. 8 is a cross-sectional view showing an arrangement of a general laser printer including an embodiment of the present invention.

In order to realize such a process, it is preferable to use the power supply monitoring circuit 313 having an arrangement shown in FIG. 6. Output of an AC power source 901 shown in FIG. 7A is first depressed in voltage by a voltage depressing transformer 902 as shown in FIG. 7B, rectified by a bridge diode 903 as shown in FIG. 7C, binarized by a waveform shaping circuit 904 as shown in FIG. 7D, and is input into a delay circuit 905 and a power supply stabilizing circuit 912. The delay circuit 905 is a filter circuit comprised of a condenser and a resistor, and generates a POACTV signal shown in FIG. 7E. A Schmitt trigger type gate 906 removes noise which may be included in the POACTV signal and generates a POFF signal as shown in FIG. 7F to be input into the CPU 209.

The CPU 209 recognizes that the power source has been turned off by detecting that the POFF signal has turned to "L" level. With this arrangement, the CPU 209 can not mistake the noise included in the POACTV signal as a signal being generated when the power source is on. On the other hand, the power supply stabilizing circuit 912 creates a stable 5V power supply as shown in FIG. 7G based on a digital signal input by the wave-shaping circuit 904 which is then supplied to the CPU 209. A large-sized condenser not shown in the drawings is arranged in the power supply circuit which extends from the power supply stabilizing circuit 912 to the CPU 209 in order to secure power supply required for the actuation of the CPU 209 for a specified period PE after the power source has been turned off.

By using the power supply monitoring circuit 313 having an arrangement shown in FIG. 6, the CPU 209 is enabled to write the occurrence of an error and details of the error into the NV-RAM 312 during the specified period PE after the power source has been turned off.

The optical apparatus according to the first and second embodiments may be, for instance, employed as an optical unit in a laser printer having an arrangement which is identical with that of the prior art laser printer. That means that these optical apparatuses may be employed as an optical unit for irradiating light onto a photosensitive body drum within an electrophotographic printer. In the case where the optical apparatus is used as the optical means in the printer, a structure of the printer may be identical with that of the prior art laser printer except for the optical means, and actions of the printer are identical with those of the prior art laser printer except for the actions in connection with operations of the optical unit as shown in FIG. 2 and FIG. 6. Therefore, explanations of the identical parts will be omitted.

The optical apparatus of the first and second embodiments may be employed, for example, as optical means for irradiating a laser beam modulated in accordance with a signal showing an image to be displayed onto a surface of a screen of an image irradiating apparatus for displaying an image on the screen by irradiating the laser beam.

The invention may be embodied in other specific forms without departing from the sprit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An optical apparatus comprising:
   scanning means for scanning light irradiated from a light source to an object to be scanned at predetermined scanning periods in a predetermined direction;
   reference timing signal generating means for generating a reference timing signal upon receiving the light which has been scanned by the scanning means; and
   control means for setting a driving timing for the light source based on the reference timing signal generated by the reference timing signal generating means,
   the optical apparatus further comprising memory means for storing a table comprising driving timing data for each of a plurality of corresponding periods of the reference timing signal,
   wherein the control means measures the period of the reference timing signal generated by the reference timing signal generating means, reads out from the table stored in said memory means the driving timing data corresponding to the measured period of the reference timing signal, and sets the driving timing in accordance with the read-out driving timing data.

2. The optical apparatus of claim 1, wherein a modulation signal for controlling light irradiation is applied to the light source, and the driving timing set by the control means is composed of a first timing for terminating irradiation of light for scanning the reference timing signal generating means and a second timing for starting irradiation of information light for scanning the object to be scanned.

3. The optical apparatus of claim 1, wherein the control means terminates driving of the light source before the scanning period is stabilized and sets a driving timing for the light source based on a reference timing signal generated by the reference timing signal generating means after the scanning period has been stabilized.

4. The optical apparatus of claim 1, wherein the control means sets the driving timing for the light source only once after the scanning period of the scanning means has been stabilized, and keeps on controlling the light source based on the set driving timing starting from a time at which the driving timing has been set.

5. The optical apparatus of claim 1, wherein the control means continuously measures the period of the reference timing signal after stabilization of the scanning period, and an error process is performed in the case where the measured period is not coincident with the period of the reference timing signal which has been used for the setting of the driving timing after stabilization of the scanning period.

6. The optical apparatus of claim 5, the optical apparatus further comprising power supplying means for continuing power supply to the control means over a specified time after a power source has been turned off, wherein the error process of the control means includes a process in which it is written into nonvolatile memory means that an error process has been performed within the specified time during which the power supplying means continues power supply to the control means after the power source has been turned off.

7. The optical apparatus of claim 6, wherein the power supply means includes:
   rectification means for rectifying an electric signal supplied from an alternating-current power source;
   smoothing means for smoothing the electric signal rectified by the rectification means;
   binarization means for binarizing the electric signal smoothened by the smoothing means;
   delay means for delaying the electric signal binarized by the binarization means;
   noise eliminating means for eliminating noise components of the electric signal delayed by the delay means and supplying the obtained electric signal to the light source and the scanning means;
   electric signal generating means for generating an electric signal to be supplied to the control means, on the basis of the electric signal binarized by the binarization means; and
   a condenser interposed between the electric signal generating means and the control means.

8. The optical apparatus of claim 1, wherein said control means measures the period of the reference timing signal using a timer responsive to successive inputs of the reference timing signal.

9. An optical apparatus comprising:
   scanning means for scanning light irradiated from a light source to an object to be scanned at predetermined scanning periods in a constant direction;
   reference timing signal generating means for generating a reference timing signal upon receipt of the light scanned by the scanning means; and
   control means for measuring a period of the reference timing signal generated by the reference timing signal generating means and setting a driving timing for the light source by calculation on the basis of a predetermined relationship between the period of the reference timing signal and the driving timing for the light source as well as of the measured period of the reference timing signal.

10. The optical apparatus of claim 9, wherein said control means measures the period of the reference timing signal using a timer responsive to successive inputs of the reference timing signal.

11. An electrophotographic type printer comprising a photosensitive body and optical means for irradiating a surface of the photosensitive body with a laser beam modulated based on a signal showing an image to be printed, wherein the optical means includes:
   a light source for outputting the laser beam;
   scanning means for scanning the laser beam toward the surface of the photosensitive body at predetermined scanning periods in a constant direction;
   reference timing signal generating means for generating a reference timing signal upon receiving the light beam scanned by the scanning means;
   memory means for storing a table comprising driving timing data for each of a plurality of corresponding periods of the reference timing signal; and
   control means for measuring the period of the reference timing signal generated by the reference timing signal generating means, for reading out from the table stored in said memory means the driving timing data corresponding to the measured period of the reference timing signal, for setting the driving timing in accordance with the read-out driving timing data, and for controlling output and stoppage of the laser beam from the light source based on the set driving timing.

12. The electrophotographic type printer of claim 11, wherein said control means measures the period of the reference timing signal using a timer responsive to successive inputs of the reference timing signal.

13. An image irradiating apparatus comprising a screen which is irradiated with a laser beam to display an image and optical means for irradiating a surface of the screen with the laser beam modulated based on a signal showing the image to be displayed, wherein the optical means includes:
   a light source for outputting the laser beam;
   scanning means for scanning the laser beam toward the screen in a specified direction at predetermined scanning periods in a constant direction;
   reference timing signal generating means for generating a reference timing signal upon receipt of the laser beam scanned by the scanning means;
   memory means for storing a table comprising driving timing data for each of a plurality of corresponding periods of the reference timing signal; and
   control means for measuring the period of the reference timing signal generated by the reference timing signal generating means, reading out from the table stored in said memory means the driving timing data corresponding to the measured period of the reference timing signal, setting the driving timing in accordance with the read-out driving timing data, and controlling output and stoppage of the laser beam from the light source based on the set driving timing.

14. The image irradiating apparatus of claim 13, wherein said control means measures the period of the reference timing signal using a timer responsive to successive inputs of the reference timing signal.

15. An optical scanning apparatus comprising:
   a light source;
   scanning circuitry for scanning light from said light source across a scanned object during a scan period;
   a control circuit configured to set a timing for driving said light source, said control circuit being further configured to measure the scan period and to automatically set the timing for driving said light source in accordance with the measured scan period; and
   a memory for storing a plurality of different scan periods each associated with a respective corresponding timing for driving said light source,
   wherein said control circuit is further configured to read out one of the timings from said memory based on the measured scan period and to set the timing for driving said light source using the read out timing.

16. The optical scanning apparatus of claim 15, wherein said scanning circuitry comprises a scanning motor and said control circuit is configured to measure the scan period to set the timing for driving said light source only once after said scanning motor is in a steady-state condition.

17. The optical scanning apparatus of claim 15, wherein said scanning circuitry comprises a scanning motor and said control circuit is configured to periodically measure the scan period to set the timing for driving said light source after said scanning motor is in a steady-state condition and to automatically change the timing set for driving said light source if the measured scan period changes.

18. The optical scanning apparatus of claim 17, wherein said control circuit is further configured to compare the periodically measured scan periods with a reference scan period and to execute an error process in the absence of coincidence between one or more of the measured scan periods and the reference scan period.

19. The optical scanning apparatus of claim 15, wherein the timing for driving said light source includes a timing of a data signal and a timing of a signal onto which the data signal is modulated, the modulated signal being supplied to said light source.

20. An electrophotographic type printer comprising a photosensitive body and an optical scanning apparatus in accordance with claim 15 for irradiating the surface of the photosensitive body with a light beam modulated based on a signal representing an image to be printed.

21. An image irradiating apparatus comprising a screen which is irradiated with a light beam to display an image and an optical scanning apparatus in accordance with claim 15 for irradiating a surface of the screen with the light beam modulated by a signal representing the image to be displayed.

22. An optical scanning apparatus comprising:
   a light source;
   scanning circuitry for scanning light from said light source across a scanned object during a scan period; and
   a control circuit configured to set a timing for driving said light source, said control circuit being further configured to measure the scan period and to automatically set the timing for driving said light source in accordance with the measured scan period,
   wherein said control circuit is further configured to calculate a timing for driving said light source based on the measured scan period and to set the timing for driving said light source to the calculated timing.

23. The optical scanning apparatus of claim 22, wherein said scanning circuitry comprises a scanning motor and said control circuit is configured to measure the scan period to set the timing for driving said light source only once after said scanning motor is in a steady-state condition.

24. The optical scanning apparatus of claim 22, wherein said scanning circuitry comprises a scanning motor and said control circuit is configured to periodically measure the scan period to set the timing for driving said light source after said scanning motor is in a steady-state condition and to automatically change the timing set for driving said light source if the scan period changes.

25. The optical scanning apparatus of claim 24, wherein said control circuit is further configured to compare the periodically measured scan periods with a reference scan period and to execute an error process in the absence of coincidence between one or more of the measured scan periods and the reference scan period.

26. The optical scanning apparatus of claim 22, wherein the timing for driving said light source includes a timing of a data signal and a timing of a signal onto which the data signal is modulated, the modulated signal being supplied to said light source.

27. An electrophotographic type printer comprising a photosensitive body and an optical scanning apparatus in accordance with claim 22 for irradiating the surface of the photosensitive body with a light beam modulated based on a signal representing an image to be printed.

28. An image irradiating apparatus comprising a screen which is irradiated with a light beam to display an image and an optical scanning apparatus in accordance with claim 22 for irradiating a surface of the screen with the light beam modulated by a signal representing the image to be displayed.

* * * * *